(12) United States Patent
Komiya et al.

(10) Patent No.: US 11,192,484 B2
(45) Date of Patent: Dec. 7, 2021

(54) WORK VEHICLE

(71) Applicant: YANMAR POWER TECHNOLOGY CO., LTD., Osaka (JP)

(72) Inventors: Toshitaka Komiya, Osaka (JP); Tetsuya Iida, Osaka (JP); Shimpachi Fushimi, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/976,902

(22) PCT Filed: Feb. 28, 2019

(86) PCT No.: PCT/JP2019/007727
§ 371 (c)(1),
(2) Date: Aug. 31, 2020

(87) PCT Pub. No.: WO2019/176550
PCT Pub. Date: Sep. 19, 2019

(65) Prior Publication Data
US 2021/0039733 A1 Feb. 11, 2021

(30) Foreign Application Priority Data

Mar. 14, 2018 (JP) .............................. JP2018-046589
Nov. 16, 2018 (JP) .............................. JP2018-215386

(51) Int. Cl.
*B60N 3/02* (2006.01)
*B60N 2/005* (2006.01)
(Continued)

(52) U.S. Cl.
CPC ............... *B60N 3/02* (2013.01); *B60N 2/005* (2013.01); *B60R 3/002* (2013.01); *B62D 25/16* (2013.01); *B62D 63/04* (2013.01); *B62D 1/04* (2013.01)

(58) Field of Classification Search
CPC .......... B60N 3/02; B60R 3/002; B62D 25/16; B62D 33/0617; B62D 49/06; B62D 49/0671
(Continued)

(56) References Cited

U.S. PATENT DOCUMENTS 7,452,021 B2 * 11/2008 Shibaoka ............... B60K 26/02
296/71
2008/0106112 A1 * 5/2008 Shibaoka .................. G05G 1/04
296/71

FOREIGN PATENT DOCUMENTS

EP 3470262 A1 * 4/2019 .......... B62D 25/168
JP 07-005939 U 1/1995
(Continued)

OTHER PUBLICATIONS

International Search Report for PCT Patent App. No. PCT/JP2019/007727 (dated Apr. 16, 2019).

*Primary Examiner* — Jason S Daniels
(74) *Attorney, Agent, or Firm* — Cermak Nakajima & McGowan LLP; Tomoko Nakajima

(57) ABSTRACT

A work vehicle includes a driver's step, a driver's seat disposed further rearward than the driver's step and between left and right rear traveling units, a steering wheel disposed in front of the driver's seat, left and right fenders that cover both of the rear traveling units from above; a boarding section that enables boarding and deboarding to and from the driver's step at a position on a front side of at least one of the fenders, and a gripping portion that is provided on a forward portion of the boarding section and is graspable to a driver when boarding and deboarding. The gripping portion is configured to have an inclined posture that is positioned further forward toward the outward side of the vehicle body, in a plan view.

4 Claims, 16 Drawing Sheets

(51) Int. Cl.
 *B60R 3/00* (2006.01)
 *B62D 25/16* (2006.01)
 *B62D 63/04* (2006.01)
 *B62D 1/04* (2006.01)

(58) Field of Classification Search
 USPC ....................................................... 296/1.02
 See application file for complete search history.

(56) References Cited

FOREIGN PATENT DOCUMENTS

| | | |
|---|---|---|
| JP | 10-230867 A | 9/1998 |
| JP | 2009-035185 A | 2/2009 |
| JP | 2014-135932 A | 7/2014 |
| JP | 2017-114328 A | 6/2017 |

* cited by examiner

WORK VEHICLE

This application is a national phase entry under 35 U.S.C. § 371 of PCT Patent Application No. PCT/JP2019/007727, filed on Feb. 28, 2019, which claims priority under 35 U.S.C. § 119 to Japanese Patent Application No. 2018-046589, filed Mar. 14, 2018 and Japanese Patent Application No. 2018-215386, filed Nov. 16, 2018, all of which are incorporated by reference.

TECHNICAL FIELD

The present invention relates to a work vehicle having a driver's step, a driver's seat disposed further rearward than the driver's step and between left and right rear traveling units, a steering wheel disposed in front of the driver's seat, fenders on the left and right sides that cover upper portions both of the rear traveling units, a boarding section that enables boarding and deboarding to and from the driver's step at a position on a front side of at least one of the fenders, a gripping portion provided on a forward portion of the boarding section and is graspable to a driver when boarding and deboarding.

BACKGROUND ART

As the gripping portion in the work vehicle described above, for example, there is a handrail for a work vehicle shown in Patent Literature 1. The handrail disclosed in Patent Literature 1 is mounted on a frame portion disposed between a rear end of a hood and a front end of a dashboard. The handrail includes a gripping body disposed in a inclined posture positioned further rearward of the vehicle body outward of the vehicle body in a plan view, an outer leg body that continues to an end portion of the gripping body outward of the vehicle body, and an inner leg body that continues to an end portion of the gripping body on the inner side of the vehicle body. The lower end portion of the outer leg body and the lower end portion of the inner leg body of the handrail are fixed to the frame portion. The gripping body of the handrail is configured in a downwardly inclined posture positioned further downward and outward of the vehicle body.

Further, FIG. 9 showing another embodiment discloses a configuration in which the gripping body of the handrail is disposed in an orientation oriented in a lateral direction along the left-right direction of vehicle body.

CITATION LIST

Patent Literature

Patent Literature 1: Japanese Unexamined Patent Publication No. 2017-114328

DISCLOSURE OF INVENTION

Problems to be Solved by the Invention

In the configuration in which the gripping body of the handrail is disposed in the inclined posture positioned rearward and outward of the vehicle body, for example, when boarding along the left and right direction from the lateral outward position of the vehicle body with respect to the boarding section of the vehicle body, the gripping body of the handrail is grasped while the left arm, which is positioned on the forward side of the vehicle body, is close to the human body. Therefore, it is difficult to grip the gripping body of the handrail, and it is difficult to apply a force to the gripping body, and there is room for improvement in the gripping operation surface in boarding and deboarding. In particular, there is a disadvantage that the width of the boarding section as a doorway disposed in the forward position of the fender is visually perceived as narrow by the gripping body of the handrail that is inclined toward the rearward side of the vehicle body.

Further, in the case where the gripping body of the handrail is configured in a downwardly inclined posture downward and outward of the vehicle body, when a force is applied to the gripping body, the gripping position tends to be shifted to the downward side, and there is room for improvement in the viewpoint.

Further, in the configuration in which the gripping body of the handrail is disposed in a laterally oriented orientation along the left-right direction of the vehicle body, it is difficult to apply a force when gripping the gripping body of the handrail, and the gripping position tends to be shifted the outward of the vehicle body along the longitudinal direction of the gripping body, and there is room for improvement in the gripping operation when boarding and deboarding.

In consideration of the actual circumstances, the main object of the present invention is to provide a work vehicle capable of easily boarding and deboarding to or from a lateral side of a vehicle body by improving grasping operability during boarding and deboarding and visually improving the width of a boarding section.

Means for Solving the Problems

A first feature structure according to the present invention resides in that a work vehicle includes a driver's step, a driver's seat disposed further rearward than the driver's step and between rear traveling units on left and right sides, a steering wheel disposed in front of the driver's seat, fenders on the left and right sides that cover upper portions of both the rear traveling units, a boarding section that enables boarding to and deboarding from the driver's step at a position on a front side of at least one of the fenders, and a gripping portion that is provided on a forward portion of the boarding section and is graspable to a driver when boarding and deboarding, wherein the gripping portion is configured in an inclined posture that is positioned further forward toward the outward side of the vehicle body, in a plan view.

According to the above configuration, the gripping portion is disposed in an inclined posture that is positioned further forward toward the outward side of the vehicle body, in a plan view. Therefore, for example, when boarding along the left-right direction from the lateral outward position of the vehicle body with respect to the boarding section of the vehicle body, it is possible to easily grip the gripping portion with a natural orientation in which the left arm, which is positioned on the forward side of the vehicle body, is slightly opened to the outer side of the human body. Further, in the gripping state, the grip and the left arm have a reasonable intersection angle. Therefore, it is possible to prevent a strain on the left hand gripping the grip when boarding. Further, the grip, which is inclined toward the forward side of the vehicle body, allows the width of the boarding section at the forward side position of the fender to be visually widened.

By improving the grasping operability in boarding and deboarding, and visually improving the width of the boarding section, it is possible to easily board the vehicle from the lateral outward side position of the vehicle body.

A second feature structure according to the present invention resides in that the gripping portion extends upward from a foot guard covering the front side of the boarding section.

According to the above configuration, the foot guard disposed on the front side of the boarding section is a rigid structure that has a height for preventing mud from scattering from the front side of the traveling portion, and projects outward of the vehicle body. By providing the gripping portion extending upward from the foot guard, the grip can be attached firmly with high grasping operability and a simple structure.

A third feature structure according to the present invention resides in that the gripping portion includes a horizontal gripping body disposed to be horizontally or substantially horizontally in an inclined posture that is positioned further forward toward the outward side of the vehicle body, in a plan view, and a vertical gripping body which continues to an end portion of the horizontal gripping body outward of the vehicle body, wherein the vertical gripping body is connected to the foot guard in an orientation in which the vertical gripping body extends along a vertical direction.

According to the above configuration, the main part of the gripping portion is configured with a horizontal gripping body disposed to be horizontally or substantially horizontally in an inclined posture that is positioned further forward toward the outward side of the vehicle body, in a plan view. Therefore, it is possible not only to grasp the horizontal gripping body at a substantially right angle in a natural orientation, but also to suppress the slipping movement of the grip position. Further, the vertical gripping body, which is graspable to a driver when boarding and deboarding, continues at the end portion of the horizontal gripping body on the outward of the vehicle body. Further, the vertical gripping body is connected to the foot guard in an orientation along the vertical direction. Therefore, it is possible to assist the up and down movement of the human body up to the height of the driver's step.

A fourth feature structure according to the present invention resides in that a lower end portion of the vertical gripping body of the gripping portion is provided on a forward portion of a side edge portion of the foot guard on outward of the vehicle body.

According to the above configuration, since the lower end portion of the vertical gripping body of the gripping portion is disposed forward of the side edge portion of the foot guard, outward of the vehicle body, the width of the boarding section disposed at the forward side position of the fender can be easily visually widened. Further, when boarding to and deboarding from the driver's step, it is possible to avoid the lower end portion of the vertical gripping body of the gripping portion from becoming an obstacle.

A fifth feature structure according to the present invention resides in that a mounting seat for a mounting bracket of the gripping portion is provided on a column frame in a steering column cover, which is disposed in front of the driver's seat, and an opening is formed in the steering column cover so the opening allowing the mounting bracket to be inserted through the opening and to be attached to and detached from the mounting seat from outside.

According to the above configuration, the mounting bracket for the gripping portion is mounted on the mounting seat provided on the column frame. Therefore, compared to the case where the mounting bracket for the gripping portion is extended from the boarding section side of the driver's step, it is possible to secure a wide space for boarding to and deboarding from the driver's step. Moreover, it is possible to detach the mounting seat for the column frame and the mounting bracket for the gripping portion from the outside through the opening of the steering column cover. Therefore, it is possible to easily detach the gripping portion from the mounting seat of the column frame without removing the steering column cover.

DESCRIPTION OF EMBODIMENTS

Embodiments according to the present invention will be described with reference to the drawings.

First Embodiment

Figure 1:
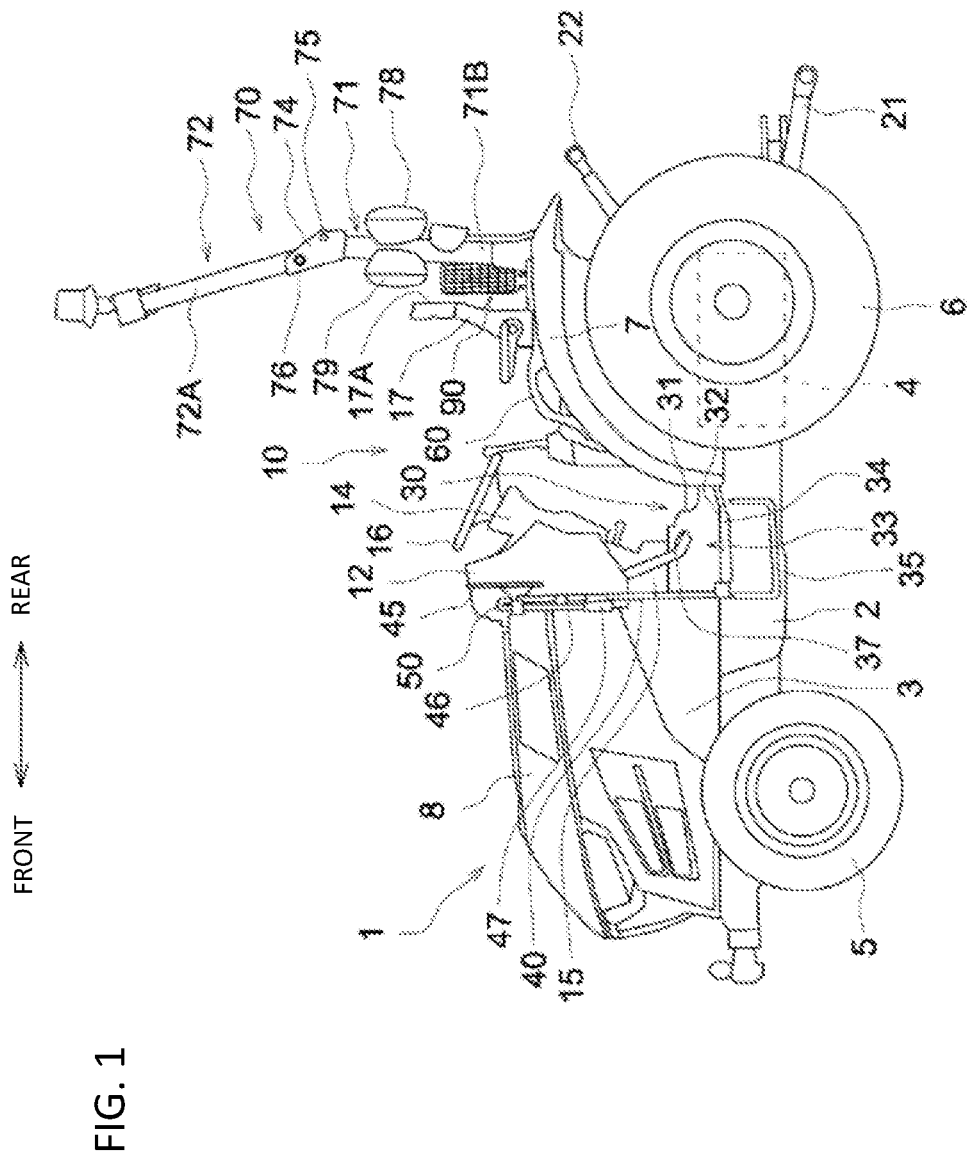
FIG. 1 is an overall side view of a tractor which is an example of a work vehicle.
Figure 2:
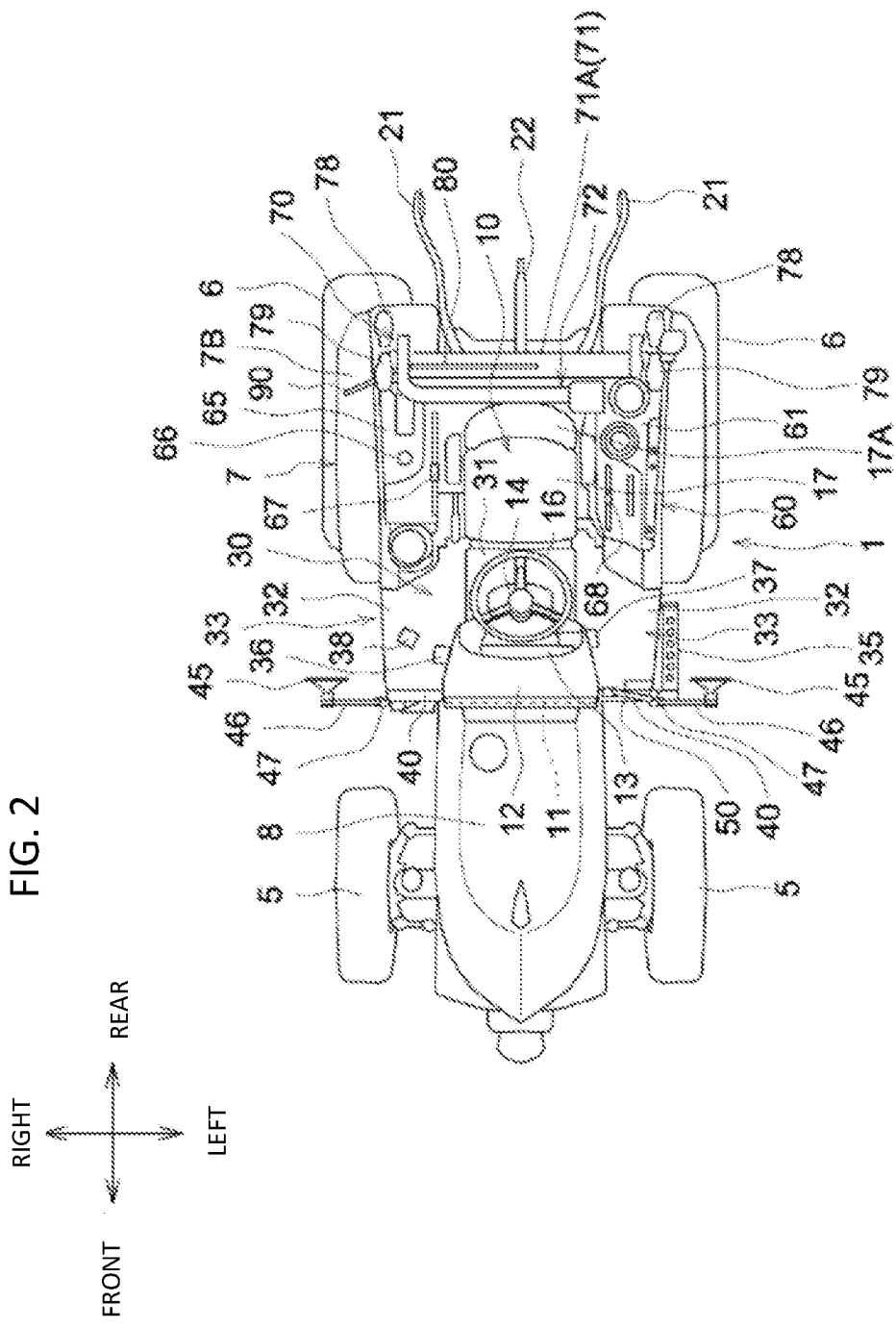
FIG. 2 is an overall plan view of the tractor.
Figure 3:
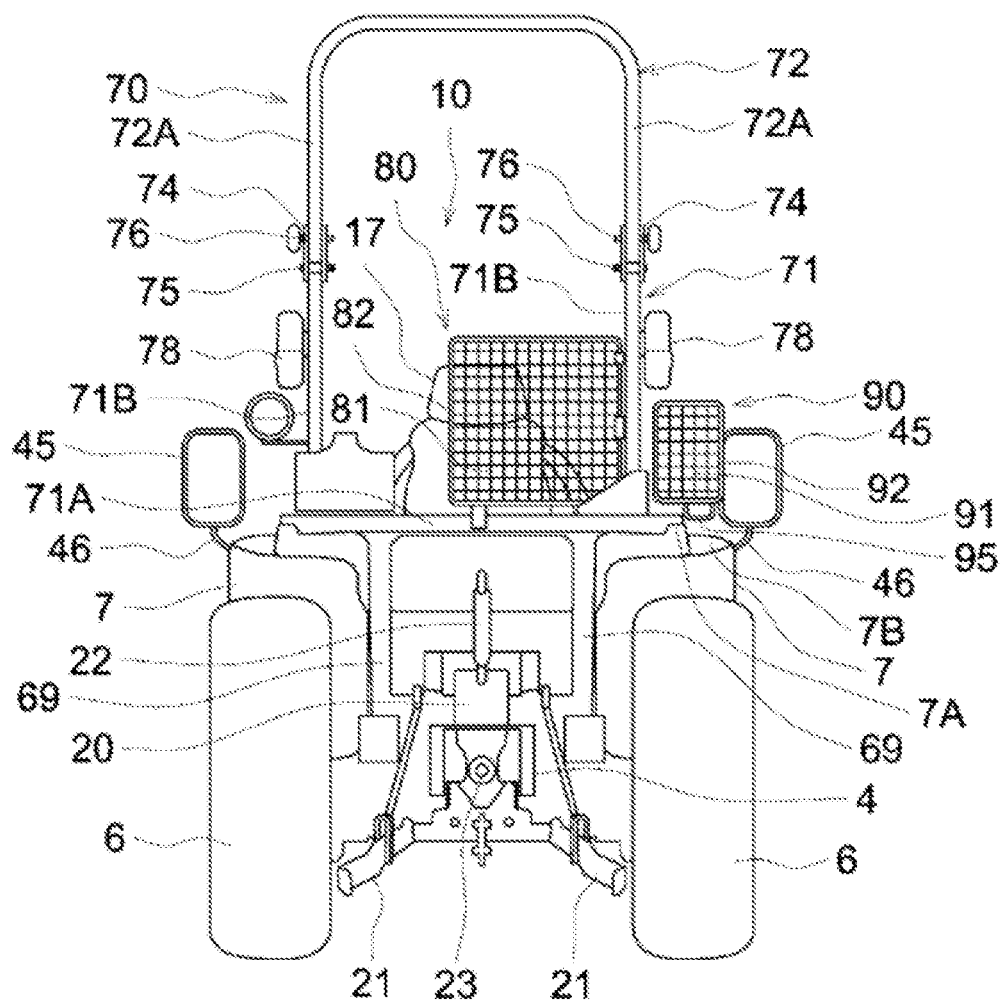
FIG. 3 is an overall rear view of the tractor.

FIGS. 1 to 3 show a tractor 1 of a lops type as an example of a work vehicle according to the present embodiment. In the description of the present embodiment, for convenience, in FIG. 1 showing the side surface of the tractor 1, the left side of the paper surface, which is the forward (front) direction of the tractor 1, is referred to as a forward side of the vehicle body, and the right side of the paper surface is referred to as a rearward (back) side of the vehicle body. Further, in FIG. 2 showing a plane of the tractor 1, the lower side of the paper surface is referred to as a left side of the vehicle body, and the upper side of the paper surface is referred to as a right side of the vehicle body.

As shown in FIGS. 1 to 3, the tractor 1 is provided with an engine portion 3 including an engine and the like on the front region of a machine body frame 2, which is framed by being stretched in the front-rear direction. A transmission case 4 including a transmission, not shown, for changing the traveling speed of the tractor 1, is disposed in the rear end portion of the machine body frame 2. Left and right front wheels 5 are disposed as front traveling units on the front region of the machine body frame 2. Left and right wheels 6 are disposed as rear traveling units on the rear region of the machine body frame 2. Fenders 7 are provided to cover the left and right wheels 6 from the upper side and the inward side of the vehicle body in the left-right direction of the vehicle body, respectively. Note that the tractor 1 may be implemented in a form in which a crawler is used as the traveling unit.

As shown in FIGS. 1 and 2, the tractor 1 includes a driving portion 10 on the rearward of a hood 8 that covers the engine portion 3. Specifically, in the rear region of the hood 8, a hot air shield plate 11 (see FIGS. 2 and 5) is vertically provided from the machine body frame 2 in a state in which the engine portion 3 and the driving portion 10 are shielded from each other. A dashboard 12 is provided on the hot air shield plate 11. The dashboard 12 is provided with an instrument panel 13 serving as a display unit that displays a speed, a remaining amount of fuel, and the like. A steering column cover 15 covering a steering column 14 is provided on the rearward of the dashboard 12. A steering wheel (steering handle) 16 is provided at the upper end of the steering column cover 15 so as to project from the steering column cover 15, and be supported by a steering shaft (not shown) of the steering column 14.

As shown in FIGS. 1 and 2, a driver's seat 17 is provided on the rearward of the steering column cover 15 at a predetermined distance. The driver's seat 17 is disposed between the left and right fenders 7. As shown in FIG. 3, a hydraulic work device lifting mechanism 20 for lifting and lowering a work device (not shown) such as a rotary tilling device is mounted on the rear upper surface of the transmission case 4 disposed below the driver's seat 17. As shown in FIGS. 1 to 3, the work device is connected to the rearward of the transmission case 4 of the tractor 1 via a three-point link mechanism including a pair of left and right lower links 21, and a top link 22. The front end portions of the left and right lower links 21 are rotatably connected to the left and right side surfaces of the rear region of the transmission case 4, respectively. The front end portion of the top link 22 is rotatably connected to a rear region of the work device lifting mechanism 20. A power take-off (PTO) shaft 23 for transmitting the driving force of the engine portion 3 to the work device is provided on the rear surface of the transmission case 4, so as to project rearward.

As shown in FIGS. 4 to 7, in the driving portion 10, a driver's step 30 is provided as a floor surface portion on the machine body frame 2 from a position immediately behind the hot air shield plate 11 to a position immediately before the transmission case 4. The driver's step 30 includes a driving portion floor 31, and left and right side steps 32. The driving portion floor 31 is disposed at the left and right central portions in the vehicle body width direction between the steering wheel 16 and the driver's seat 17. The left and right side steps 32 are continuously disposed on the left and right outward sides of the driving portion floor 31 between the front end portions of the left and right fenders 7 and left and right foot guards 40 described below. The left and right side steps 32 constitute boarding sections 33 that allow for boarding and deboarding to and from the driver's step 30 between the front end portions of the left and right fenders 7 and the left and right foot guards 40. Among the left and right boarding sections 33, the boarding section 33 located on the left side of the vehicle body is configured as a main doorway. An auxiliary side step 35 that assists boarding and deboarding is vertically provided in a U shape in a side view, at the outer end portion of a floor frame 34 on the machine body frame 2 side that supports the side step 32 on the main doorway side, and at a lower position than the side step 32.

As shown in FIG. 2, a forward pedal 36 and a reverse pedal 38 are disposed on the right foot portion of the driving portion floor 31 where the right leg of a driver seated on the driver's seat 17 is located. As shown in FIGS. 1 and 2, a brake pedal 37 is disposed on the left foot portion where the left foot of a driver seated in the driver's seat 17 is located.

Figure 4:
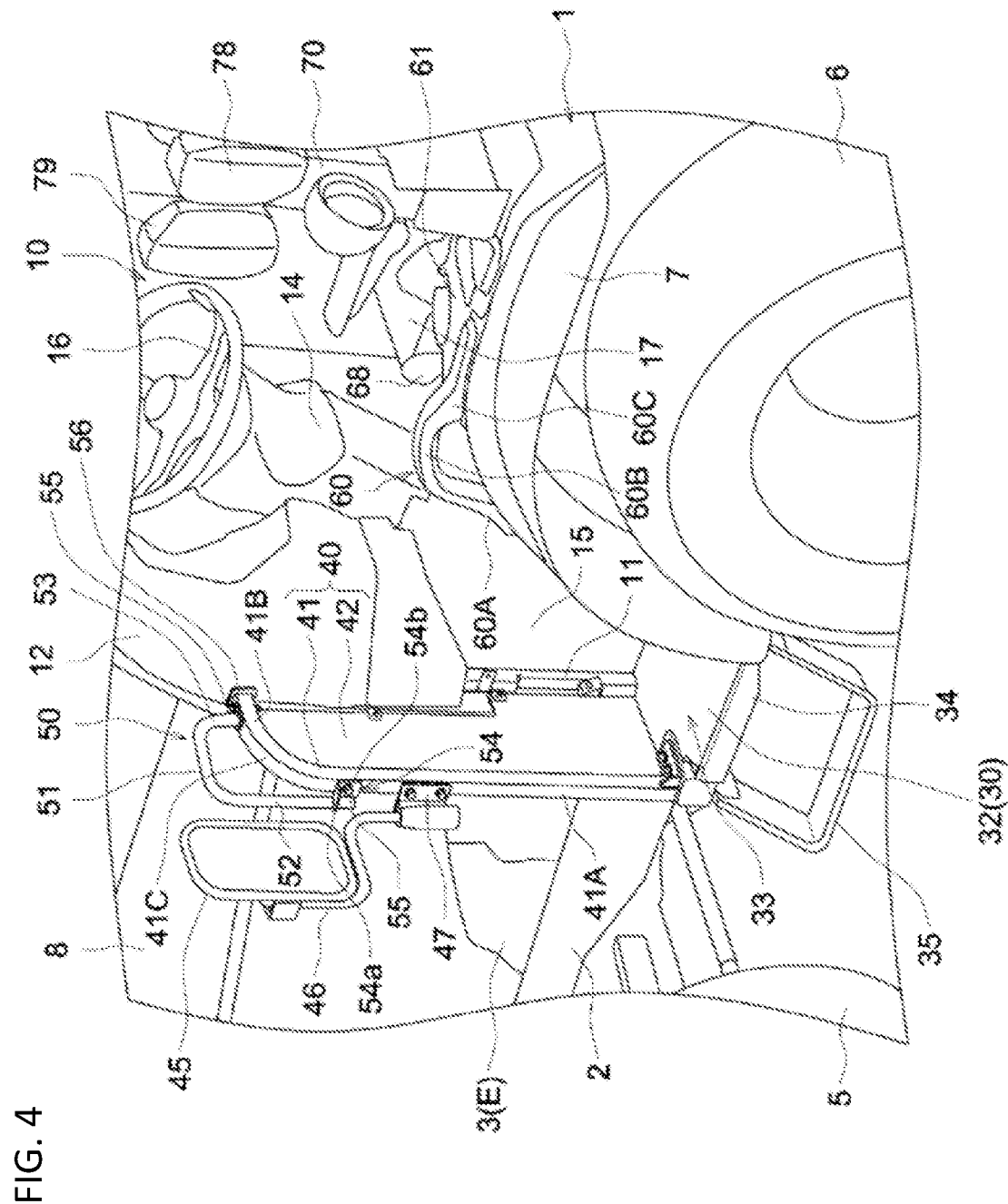
FIG. 4 is a perspective view of a grip structure for boarding and deboarding the tractor from a rear view.
Figure 5:
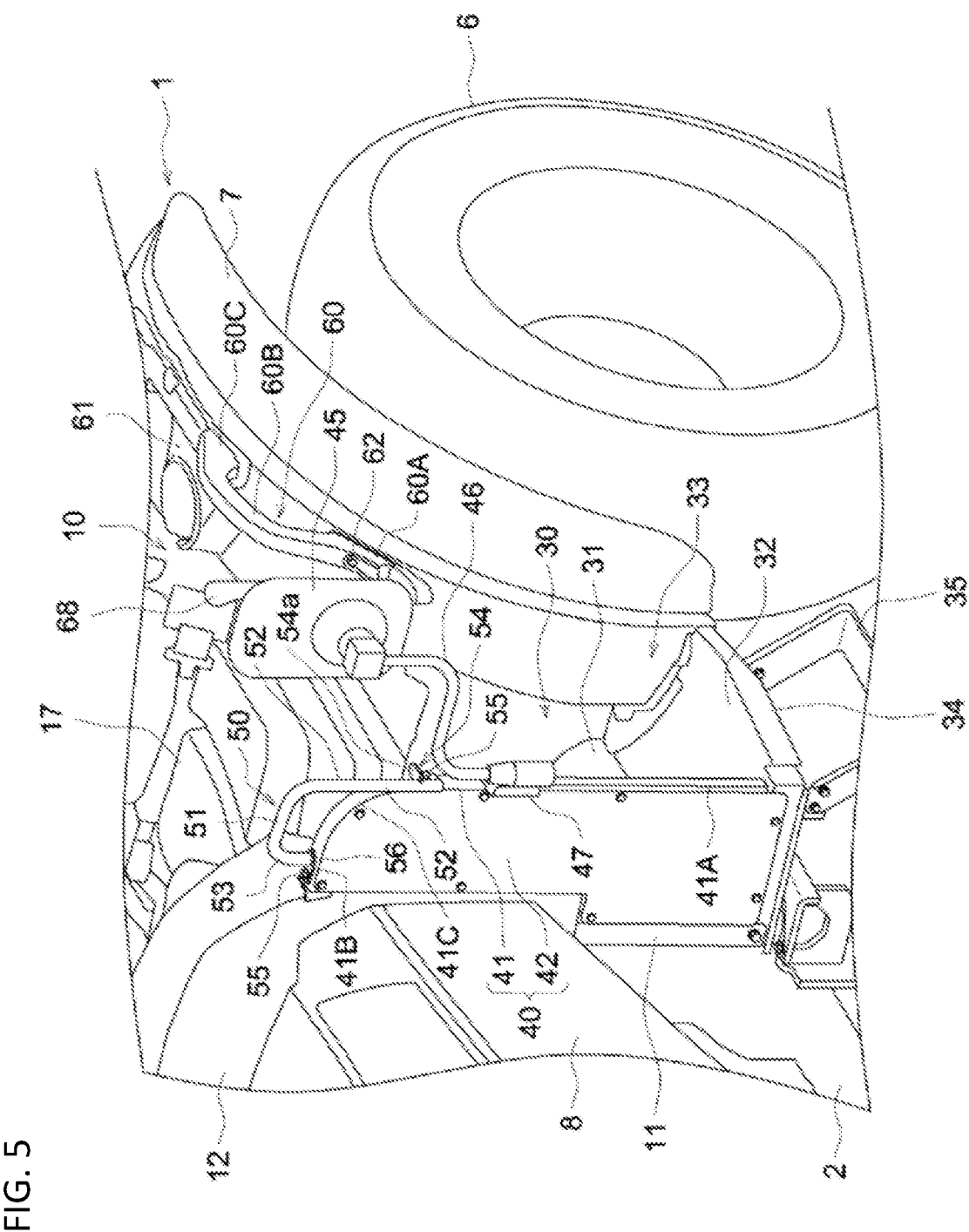
FIG. 5 is a perspective view of the grip structure for boarding and deboarding the tractor from a front view.
Figure 6:
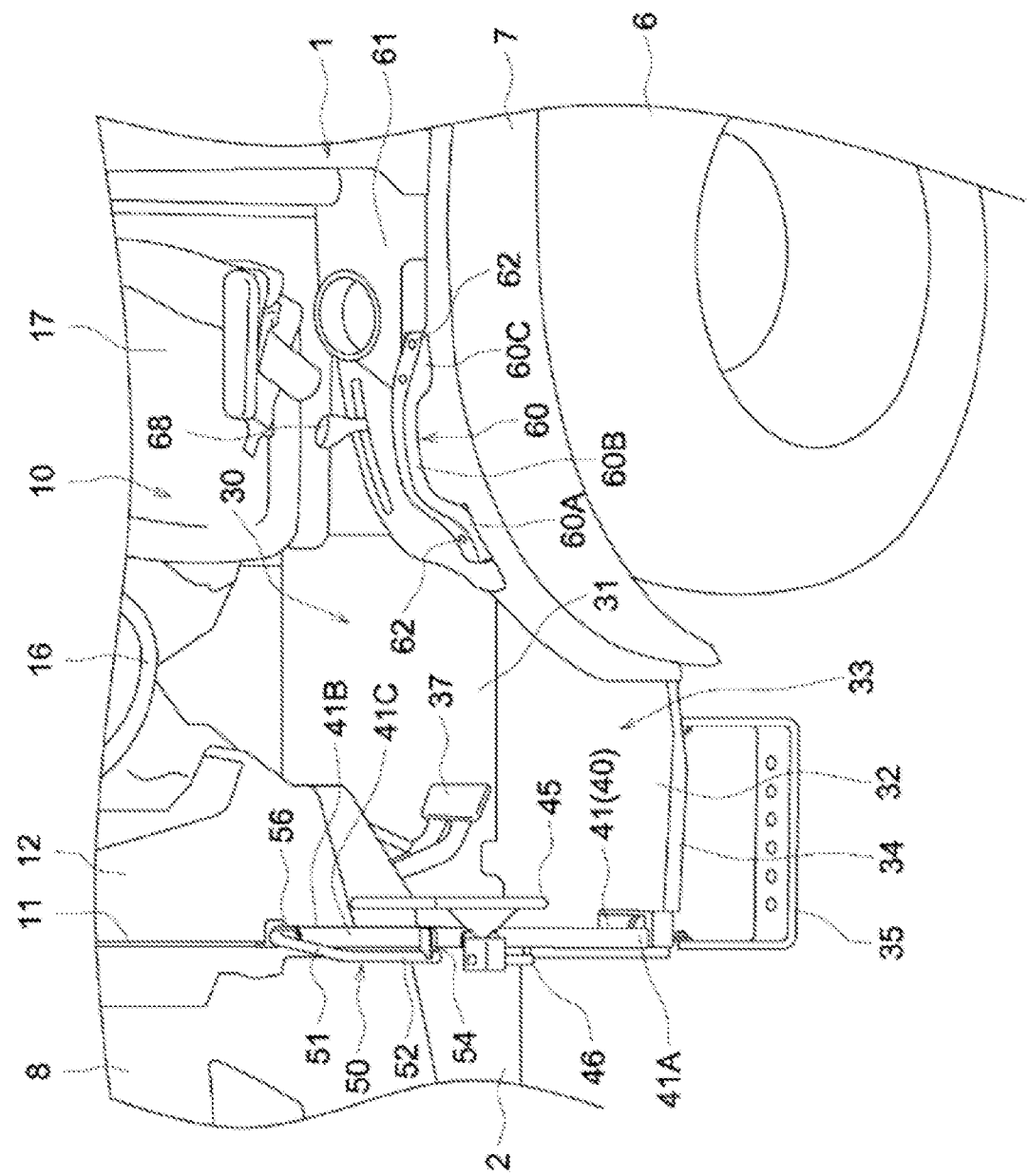
FIG. 6 is a perspective view of the grip structure for boarding and deboarding the tractor from a side view.

As shown in FIGS. 4 to 6, each of the left and right foot guards 40 includes a guard support member 41 having a rectangular tubular shape and formed to be bent in a substantially inverted "L" shape when viewed in the front-rear direction, and a transparent windproof plate 42 covering the forward side of the boarding section 33 at the front side position of the guard support member 41. The guard support member 41 is fixedly connected to the upper portions of the left and right outer end edges of the hot air shield plate 11 (see FIG. 2) and the front region of the outer end of the floor frame 34 in an orientation along the left-right direction. The windproof plate 42 is fixedly connected to the guard support member 41, the outer edge of the hot air shield plate 11, and the front end of the floor frame 34. The windproof plate 42 covers, in a transparent manner, a vertical window elongated in the up-down direction, which is formed by the guard support member 41, the outer edge of the hot air shield plate 11, and the front end of the floor frame 34.

A mounting portion 47 is provided for mounting a support arm 46 of a rearview mirror 45 for confirming the rearward, on the upper side of a vertical frame portion 41A that constitutes the side edge portion of the foot guard 40, outward of the vehicle body and disposed in the vertical orientation.

As shown in FIGS. 4 to 7, a first gripping portion 50 is provided on the top portion of the foot guard 40 located in the forward portion of the boarding section 33 on the left side of the vehicle, so that a driver can grip with her/his hand on the forward side of the vehicle body when boarding and deboarding. A second gripping portion 60 is provided on the upper portion of the fender 7 located at the rearward portion of the boarding section 33 on the left side of the vehicle, so that a driver can grip with her/his hand on the rearward side of the vehicle body when boarding and deboarding. It is possible to safely and easily board and deboard to and from the boarding section 33 on the left side of the vehicle body by gripping the first gripping portion 50 and the second gripping portion 60 disposed before and after the boarding section 33.

As shown in FIGS. 4 to 6, the first gripping portion 50 includes a horizontal gripping body 51, a vertical gripping body 52, and a vertical mounting body 53. The horizontal gripping body 51 is horizontally or substantially horizontally disposed in an inclined posture that is positioned further forward toward the outward side of the vehicle body, in a plan view. The vertical gripping body 52 is continuous to an end portion of the horizontal gripping body 51, outward of the vehicle body. The vertical mounting body 53 is continuous to an end portion of the horizontal gripping body 51 on the inner side of the vehicle body. The horizontal gripping body 51, the vertical gripping body 52, and the vertical mounting body 53 of the first gripping portion 50 are continuously formed by bending a round pipe.

The vertical gripping body 52 has a gripping length substantially equal to the gripping length of the horizontal gripping body 51, and extends downward along the vertical frame portion 41A of the foot guard 40 in the vertical orientation. Therefore, the overall length of the vertical gripping body 52 is configured to be longer than the overall length of the horizontal gripping body 51.

As shown in FIGS. 4 to 6, a horizontal plate piece 54a in a lower mounting member 54, which is formed to be bent in an L shape as viewed in the front-rear direction, is fixed to a lower end portion of the vertical gripping body 52 of the first gripping portion 50 so as to project toward the rearward side of the vehicle body. A vertical plate piece 54b, which is continuous to the horizontal plate piece 54a of the lower mounting member 54, is detachably fixed to the outer surface of the vertical frame portion 41A of the guard support member 41 with a bolt 55. Therefore, as shown in FIGS. 4 to 6, the lower end portion of the vertical gripping body 52 of the first gripping portion 50 is disposed in the forward portion of the vertical frame portion 41A of the guard support member 41.

A horizontal plate-shaped upper mounting member 56 is fixed to a lower end portion of the vertical mounting body 53 of the first gripping portion 50. The upper mounting member 56 is detachably fixed to the upper surface of a horizontal frame portion 41B that constitutes the upper edge portion of the foot guard 40 with the bolt 55.

Further, as shown in FIGS. 4 to 6, the first gripping portion 50 is attached so as to project upward with respect to a bent frame portion 41C that connects the vertical frame portion 41A and the horizontal frame portion 41B of the guard support member 41. Therefore, it is possible to secure a sufficient gripping space between the bent frame portion 41C of the guard support member 41, and the horizontal gripping body 51 and the vertical gripping body 52 of the first gripping portion 50.

Figure 7:
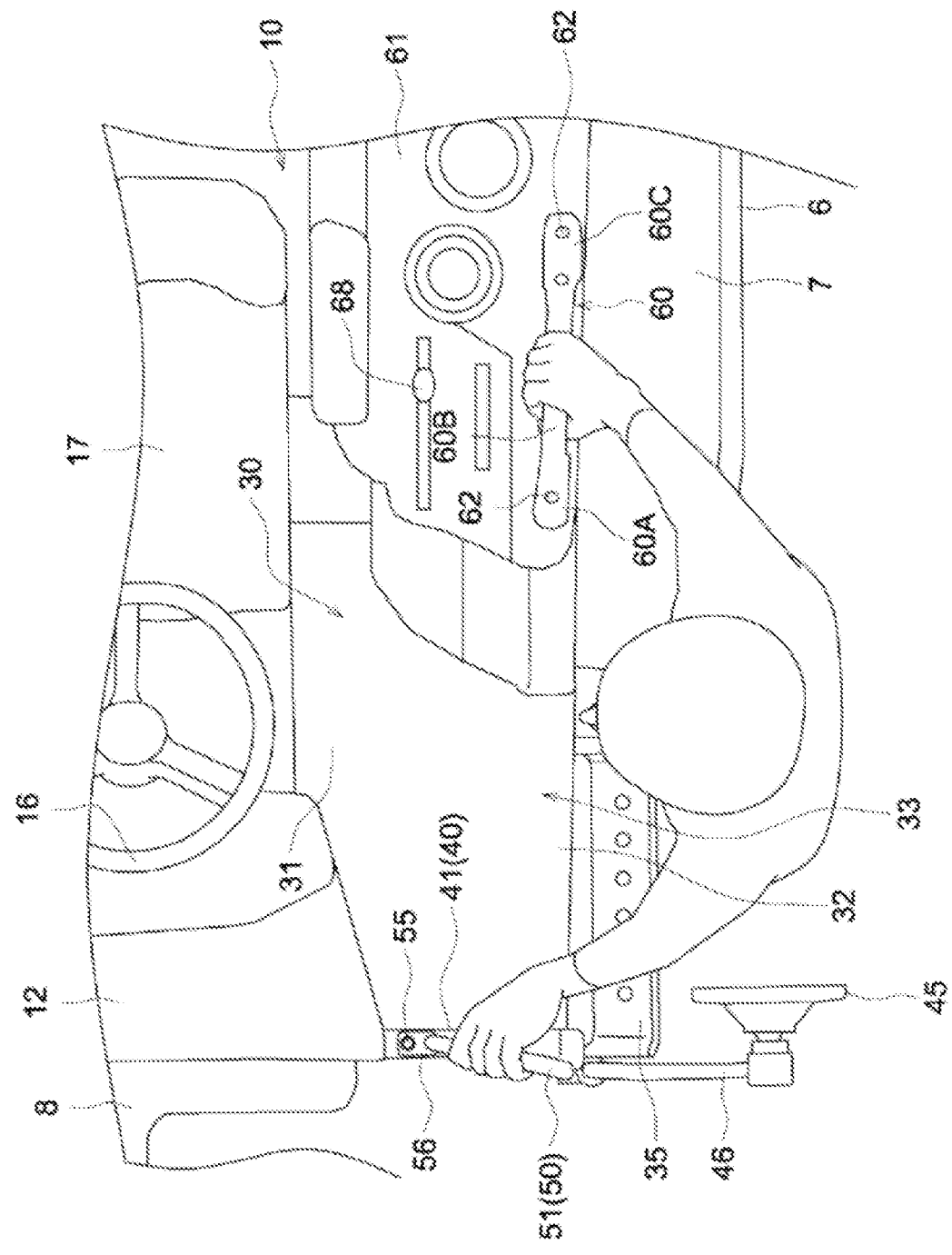
FIG. 7 is an explanatory diagram showing boarding and deboarding state.

Further, the horizontal gripping body 51 of the first gripping portion 50 is horizontally or substantially horizontally disposed in an inclined posture that is positioned further forward toward the outward side of the vehicle body in a plan view. Therefore, for example, as shown in FIG. 7, when boarding at a right angle along the left-right direction from the lateral outer side position of the vehicle body relative to the boarding section 33 on the left side of the vehicle body, it is possible to easily grip the horizontal gripping body 51 of the first gripping portion 50 in a natural orientation in which the left arm on the forward side of the vehicle body is slightly open toward the outer side of the human body. Moreover, in the gripping state, the horizontal gripping body 51 of the first gripping portion 50 and the left arm have a reasonable crossing angle. Therefore, in boarding, the left hand gripping the horizontal gripping body 51 of the first gripping portion 50 is not burdened. Further, by the horizontal gripping body 51 of the first gripping portion 50 inclined toward the forward side of the vehicle body, the width of the boarding section 33 on the left side of the vehicle body can be visually widened. By improving the grasping operability at the time of boarding and deboarding, and visually improving the width of the boarding section 33 on the left side of the vehicle body, it is possible to easily board from the left-right direction on the lateral outer side of the vehicle body.

Since the horizontal gripping body 51 of the first gripping portion 50 is disposed horizontally or substantially horizontally, it is possible to suppress the slipping movement of the gripping position. Further, since the vertical gripping body 52 of the first gripping portion 50 is connected to the foot guard 40 in an orientation along the vertical direction, it is possible to assist the up and down movement of a human body up to the height of the driver's step 30.

As shown in FIGS. 4 to 7, the second gripping portion 60 is fixed to the upper portion of the fender 7 on the left side of the vehicle body and to the outer portion of a left side column 61 with a screw 62 in an orientation along the front-rear direction. The second gripping portion 60 includes a front leg portion 60A, a grip 60B, and a rear leg portion 60C. The front leg portion 60A is fixed to the front region side of the fender 7. The grip 60B extends rearward along the curved upper surface of the fender 7 from the upper end of the front leg portion 60A. The rear leg portion 60C extends downward from the rear end of the grip 60B, and is fixed to the rear region side of the fender 7. The front leg portion 60A, the grip 60B, and the rear leg portion 60C of the second gripping portion 60 are integrally molded of a resin.

Figure 9:
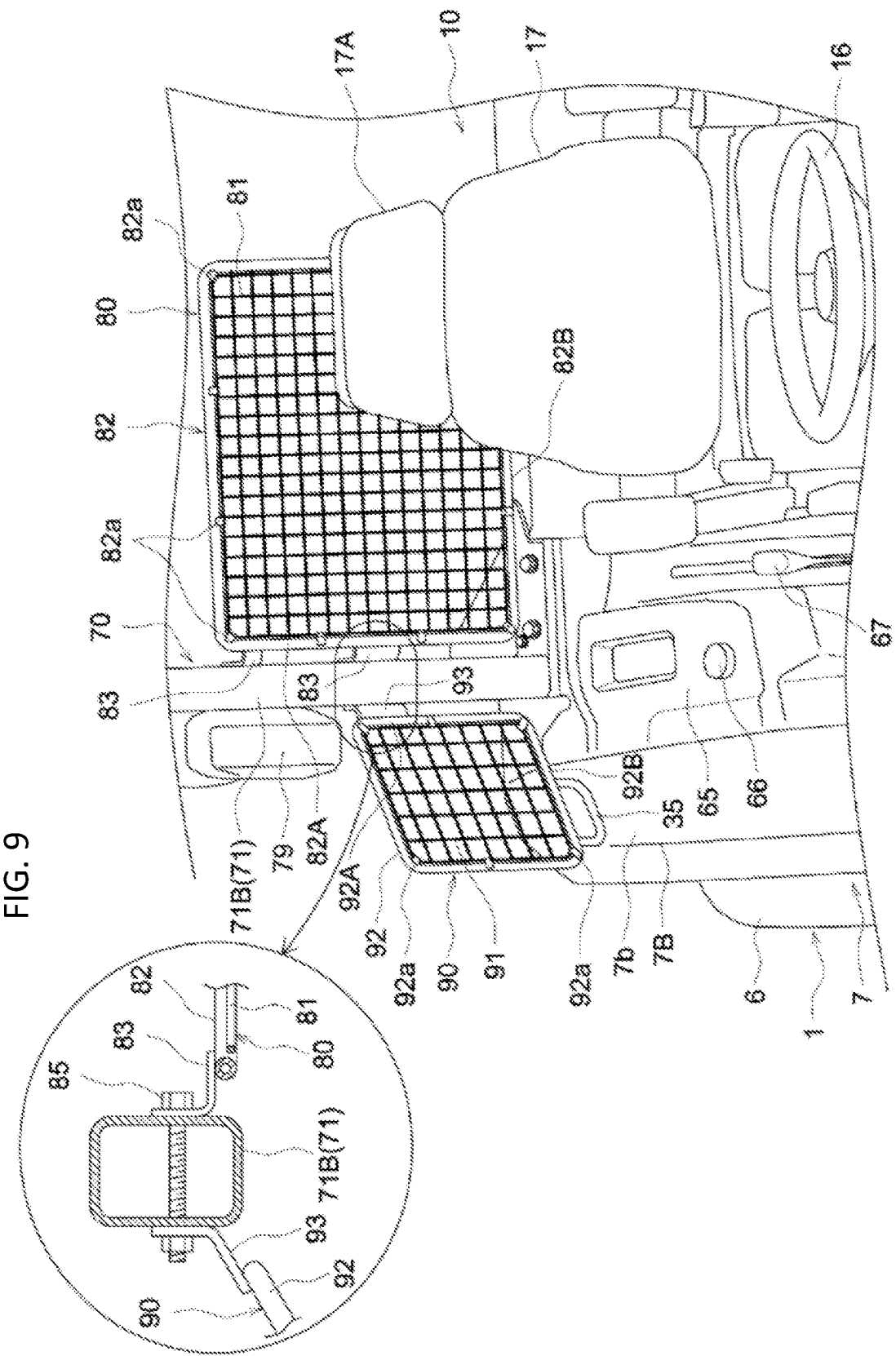
FIG. 9 is a perspective view of the rear partition wall structure of the tractor from a front view.

Further, as shown in FIGS. 2 and 9, a PTO on/off switch 66 and a lifting operation lever 67 are provided as an example of an operation tool for operating a working equipment provided on the vehicle body, at the right side column 65 provided in the upper portion of the fender 7 on the right side of the vehicle body and its vicinity. The PTO on/off switch 66 is a switch for turning on/off the power transmission of a PTO clutch (not shown). The lifting operation lever 67 is a lever for lifting the work device lifting mechanism 20.

Further, as shown in FIGS. 4 to 6, a traveling speed change lever 68 is disposed on the left side column 61.

Figure 8:
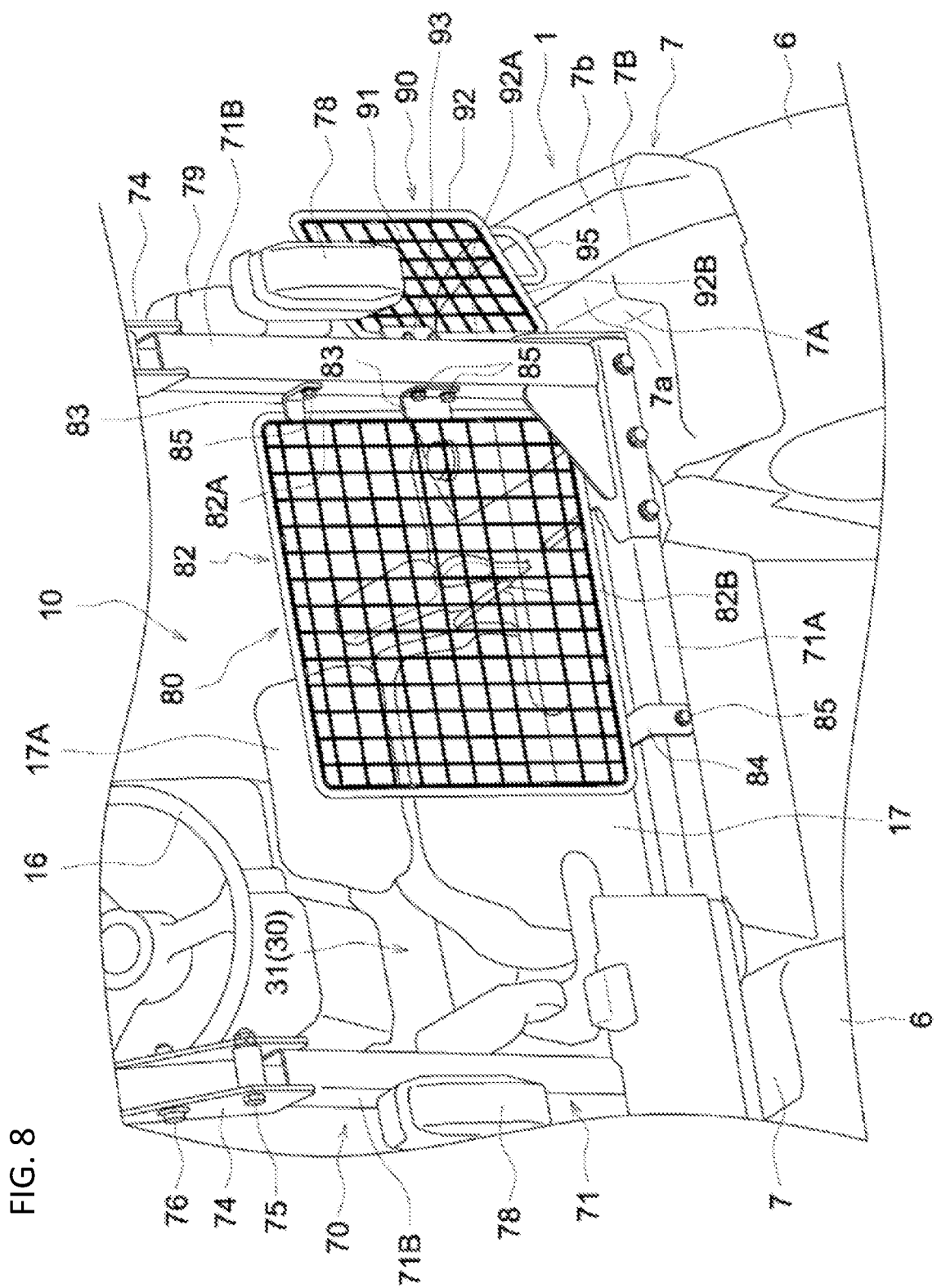
FIG. 8 is a perspective view of a rear partition wall structure of the tractor from a rear view.

As shown in FIGS. 3 and 8, a protection frame 70 is vertically provided on a base frame 69 extending upward from the rear region of the body frame 2 to protect the driver seated on the driver's seat 17 when the vehicle body rolls over. The protection frame 70 has a lower protection frame 71 fixed to the base frame 69, and an upper protection frame 72 foldably connected to the lower protection frame 71. The lower protection frame 71 has a horizontal frame portion 71A fixed to the upper end of the base frame 69 and extending along the left-right direction, and left and right lower prop frame portions 71B which are bolt-connected to both end portions of the horizontal frame portion 71A in an orientation along the up-down direction.

As shown in FIGS. 1 to 3, rear composite lamps 78 are mounted on the respective rear surface of the left and right lower prop frame portions 71B, to display a deceleration, a stop, a backward movement, a left-right rotation, or the like of the tractor 1 for a vehicle or a person behind the tractor 1. Each of the rear composite lamps 78 includes a tail lamp, a brake lamp, a reverse lamp, and a direction indicator lamp. Front composite lamps 79 for displaying the vehicle width of the tractor 1, the left-right rotation, or the like are mounted on the respective front surface of the left and right lower prop frame portions 71B for a vehicle or a person forward of the tractor 1. Each of the front composite lamps 79 includes a direction indicator lamp and a vehicle width lamp.

As shown in FIGS. 3 and 8 to 10, the upper protection frame 72 is formed to be bent in an inverted U shape when viewed in the front-rear direction. The lower end portion of the left and right upper prop frames 72A, which constitute the upper protection frame 72, is connected to a bracket 74, which is fixed to the upper end portion of the left and right lower prop frame portions 71B, so as to be swingable about a pivot pin 75 along the left-right direction. A fixing pin 76 is provided to the upper protection frame 72 so as to be insertable and withdrawable in order to fixedly hold the upper protection frame 72 in a protection orientation in which the upper protection frame 72 protrudes forward and upward, across the lower end portion of the upper prop frames 72A and the bracket 74 of both of the lower prop frame portions 71B. When the fixing pin 76 is pulled out, the upper protection frame 72 can swing rearward around the pivot pin 75, and the upper protection frame 72 can be changed to a folding orientation in which the upper protection frame 72 is folded toward the rearward side of the lower protection frame 71.

Figure 10:
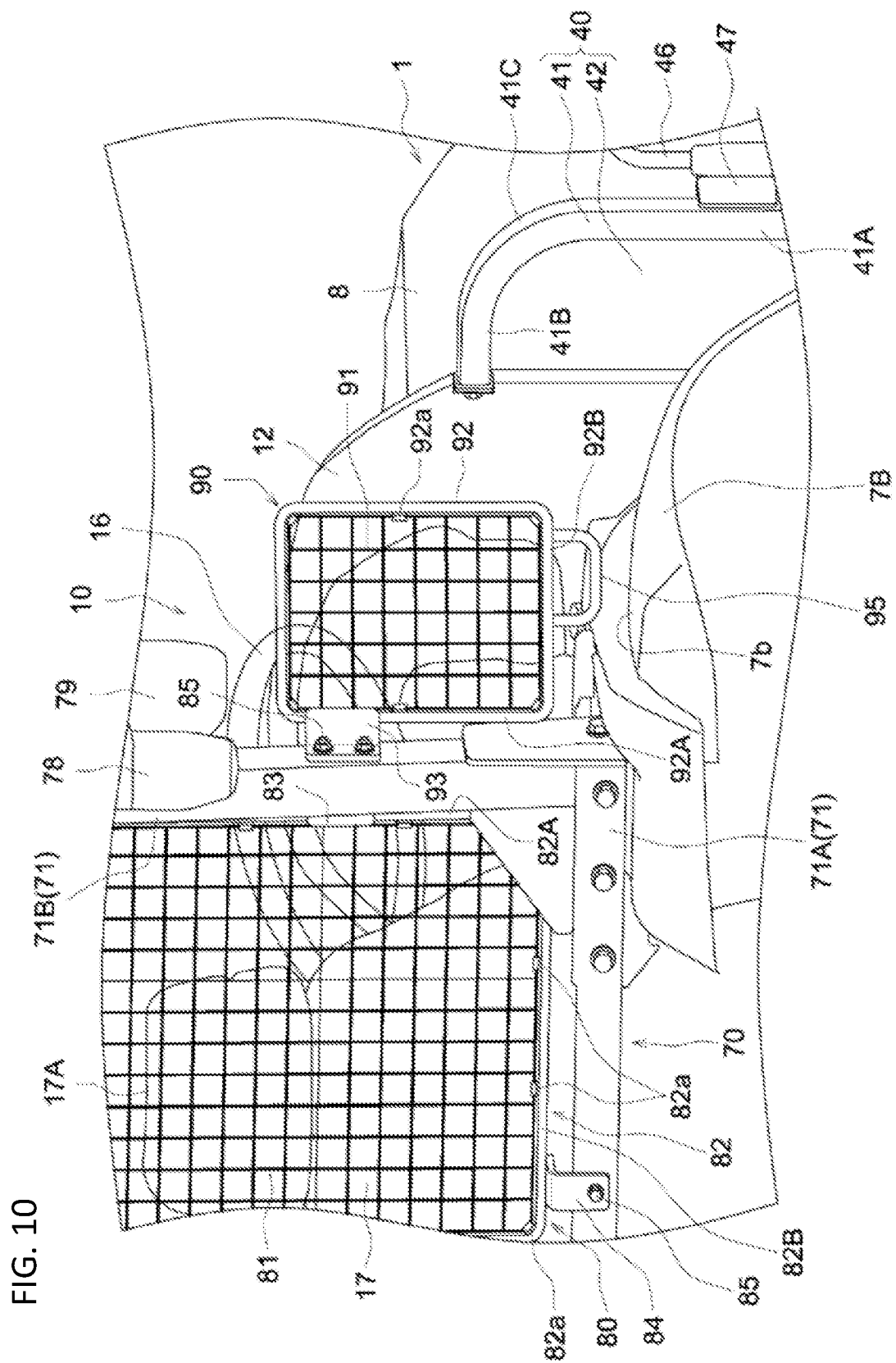
FIG. 10 is an enlarged rear view of the rear partition wall structure of the tractor.

As shown in FIGS. 8 to 10, in the rearward position of the driver's seat 17, a transparent partition wall 80, which is divided into a front region of the vehicle body defining the forward side thereof and a rear region of the vehicle body defining the rearward side thereof, is provided on the protection frame 70. The partition wall 80 includes a partition metal wire net 81 formed in a rectangular shape as viewed in the front-rear direction and having transparency and air permeability, and a metal partition holding frame 82 that sandwiches and holds the four sides of the partition metal wire net 81 with a plurality of holding pieces 82a to prevent the partition metal wire net 81 from slipping out.

The lateral width of the partition wall 80 in the left-right direction is configured with approximately the lateral width dimension extending from the inner surface inside the vehicle body of the lower prop frame portions 71B disposed on the right side of the vehicle body of the lower protection frame 71 to the position near the left end portion of the head portion 17A of the driver's seat 17. As shown in FIG. 3, the height of the partition wall 80 is configured with the approximately height dimension, that extends upward from the upper surface of the horizontal frame portion 71A of the lower protection frame 71 to a position above the head portion 17A of the driver's seat 17, and to an intermediate position in the up and down direction of the rear composite lamp 78 mounted on the lower prop frame portions 71B.

As shown in FIGS. 8 to 10, the partition wall 80 is provided so as to be shifted toward the side where the PTO on/off switch 66 and the lifting operation lever 67 of the work device lifting mechanism 20, which are examples of the operation tool for operating the working equipment, are disposed with respect to the driver's seat 17. Specifically, first mounting members 83, which are formed to be bent in an L-shape, are fixed to upper and lower portions of the vertical holding frame portion 82A on the right side of the vehicle body on the partition holding frame 82 of the partition wall 80. Further, a second mounting member 84, which is formed to be bent in an L-shape, is fixed to a position near the left end side of the lower holding frame portion 82B of the partition holding frame 82. Both of the first mounting members 83 of the partition wall 80 are detachably mounted on the lower prop frame portions 71B on the right side of the vehicle body of the lower protection frame 71 with a bolt 85. The second mounting member 84 of the partition wall 80 is detachably mounted on the horizontal frame portion 71A of the lower protection frame 71 with the bolt 85.

As described above, the PTO on/off switch (an example of the operation tool) 66 and the lifting operation lever (an example of the operation tool) 67 are collectively disposed on the right fender 7. The PTO on/off switch 6 is a switch for turning on/off the power transmission of a PTO clutch (an example of a working equipment, not shown) The lifting operation lever 67 is a lever for lifting and lowering a work device lifting mechanism (an example of the working equipment) 20. Therefore, at the rearward position of the driver's seat 17, when the partition wall 80 is provided to divide the front region of the vehicle body defining the forward side thereof, and the rear region of the vehicle body defining the rearward side thereof, the partition wall 80 can be provided so as to be shifted toward the side where the PTO on/off switch 66 and the like are provided relative to the driver's seat. Accordingly, it is possible to avoid inadvertent operation of and contact with the PTO on/off switch 66 and the lifting operation lever 67 while configuring the partition wall 80 to be shorter by the amount corresponding to the shift. The inadvertent operation and contact is caused by an operator's hand intruding from the rear region of the vehicle body through the lateral space on the right side of the driver's seat 17. Specifically, the inadvertent operation and contact is caused by an operator's hand intruding through the lateral space between the lower prop frame portion 71B on the right side of the vehicle body of the lower protection frame 71 and the right end portion of the driver's seat 17.

Therefore, as a result of the above-mentioned rational placement in which the PTO on/off switch 66 and the lifting operation lever 67 are collectively disposed on the right fender 7, it is possible to improve the visibility on the rearward side by shortening the partition wall 80, while to avoid the inadvertent operation of and contact with the PTO on/off switch 66 and the lifting operation lever 67 due to an operator's hand intruding from the rear region of the vehicle body through the lateral space on the right side of the driver's seat 17.

As shown in FIGS. 8 to 10, a side partition wall 90 is disposed so as to incline toward the forward side of the vehicle body in a state where the side partition wall 90 projects farther outward of the vehicle body than the position where the PTO on/off switch 66 and the like are disposed, on the outer edge side of the partition wall 80 on the side where the PTO on/off switch 66 and the like are disposed. The side partition wall 90 has a side partition metal wire net 91 formed in a rectangular shape as viewed in the front-rear direction, and a metal side partition holding frame 92 that sandwiches and holds the four sides of the side partition metal wire net 91 with a plurality of holding pieces 92a to prevent the side partition metal wire net 91 from slipping out.

The lateral width of the side partition wall 90 in the left-right direction is configured with a substantially lateral width dimension that extends from the outer surface on the outer side of the vehicle body of the lower prop frame portion 71B, which is disposed on the right side of the vehicle body of the lower protection frame 71, to a position near the outer end portion of the right fender 7, or a lateral width dimension that is slightly smaller than the substantially lateral width dimension. Therefore, in a state in which the side partition wall 90 is mounted on the lower prop frame portion 71B provided on the right side of the vehicle body, the side partition wall 90 largely extends outward from the outer surface of the lower prop frame portion 71B to a position near the outer end of the right fender 7 outward of the vehicle body.

Further, the height of the side partition wall 90 is configured with a height dimension, which is slightly smaller than the distance between the upper surface of the right fender 7 and the lower end of the rear composite lamp 78 mounted on the right lower prop frame portions 71B. Therefore, in a state where the side partition wall 90 is mounted on the lower prop frame portions 71B disposed on the right side of the vehicle body, the upper end of the side partition wall 90 is close to the lower end of the rear composite lamp 78, and the space between the side partition wall 90 and the rear composite lamp 78 is small. Therefore, it is possible to prevent an operator's hand from intruding through the gap between the upper end of the side partition wall 90 and the lower end of the rear composite lamp 78 from the rear region of the vehicle body to the PTO on/off switch 66 or the like.

As shown in FIGS. 8 and 10, on the upper surface of the right fender 7, the highest position is the upper surface 7a of a ridge 7A that is bulged upward at the center in the width direction and on the outer side of the lower prop frame portions 71B on the right side of the vehicle body in the lower protection frame 71. Further, the upper surface 7b of an outer fender portion 7B located on the outward of the vehicle body with respect to the ridge 7A is located at a position lower than the upper surface 7a of the ridge 7A. Therefore, the gap between the lower holding frame portion 92B of the side partition holding frame 92 and the upper surface 7b of the outer fender portion 7B of the right fender 7 becomes large. Therefore, there is a possibility that an operator's hand intrudes through the gap from the rear region of the vehicle body to the PTO on/off switch 66 or the like.

In order to prevent such intrusion, according to the present invention, as shown in FIGS. 8 to 10, a protrusion portion 95 is provided on the lower holding frame portion 92B of the side partition holding frame 92 in order to reduce the gap with the upper surface 7b of the outer fender portion 7B of the right fender 7. The protrusion portion 95 is formed of a rod-shaped or pipe-shaped partition frame formed to be bent in a flat "U" shape in a rear view.

As described above, the gap is provided between the side partition wall 90 and the upper surface of the right fender 7, and noise and deformation due to the contact between the side partition walls 90 and the fender 7 having different vibration characteristics are suppressed. Further, the protrusion portion 95 provided at the lower end portion of the side partition wall 90 reduces the gap between the lower holding frame portion 92B of the side partition holding frame 92 in the side partition wall 90, and the upper surface 7b of the outer fender portion 7B in the right fender 7. As a result, it is possible to suppress the intrusion into the PTO on/off switch 66 and the like, which uses the gap on the lower side of the side partition wall 90 as a bypass passage.

As shown in FIGS. 8 to 10, a third mounting member 93 is fixed so as to formed to be bent in a substantially "V" shape (see FIG. 9) in a plan view, on the upper portion of the vertical holding frame portion 92A on the inner side of the vehicle body in the side partition holding frame 92 of the side partition wall 90. The third mounting member 93 is formed to be bent at an obtuse angle by an angle at which the side partition wall 90 inclines forward and toward the outward side of the vehicle body of the vehicle body.

The third mounting member 93 of the side partition wall 90 is detachably mounted on the outward side surface on the outer side of the vehicle body of the lower prop frame portion 71B, which is disposed on the right side of the vehicle body of the lower protection frame 71, with the bolt 85. The third mounting member 93 of the side partition wall 90 and the first mounting member 83 on the lower side of the partition wall 80 are fastened and fixed with the bolt 85. Further, the first mounting member 83 on the upper side of the partition wall 80 is fastened and fixed with the rear composite lamp 78 with the bolt 85.

As described above, the side partition wall 90, which is disposed on the outer edge side of the partition wall 80 on the side where the PTO on/off switch 66 and the like are disposed, protrudes farther outward of the vehicle body than the arrangement position of the PTO on/off switch 66 and the like, and is inclined toward the forward side of the vehicle body. Therefore, in order to reroute an operator's hand intruding to the lateral outward side of the vehicle body from the rear region of the vehicle body to the PTO on/off switch 66 or the like, it is necessary for the operator's hand to be rerouted largely forward and toward the outward side of the vehicle body. As a result, it is possible to effectively prevent the operator's hand from intruding from the rear region of the vehicle body by detouring the lateral outward side of the vehicle body.

In particular, the side partition wall 90 protrudes more outward from the side of the vehicle body than the lower prop frame portion 71B of the lower protection frame 71. In order to reroute an operator's hand from intruding to the lateral outward side of the vehicle body from the rear region of the vehicle body of the driver's seat 17, and to the PTO on/off switch 66 or the like, it is necessary to reroute the operator's hand largely farther toward the outward side of the vehicle body of the vehicle body than the lower prop frame portions 71B by the amount that the side partition wall 90 projects. Accordingly, it is possible to effectively prevent an operator's hand from detouring the lateral outward side of the vehicle body from the rear region of the vehicle body for the intrusion.

Further, as described above, the partition wall 80 and the side partition wall 90 are configured to be detachable. Therefore, it is possible to easily perform maintenance for the partition wall 80 and the side partition wall 90 themselves, and maintenance for the vehicle body side on which the partition wall 80 and the side partition wall 90 are disposed.

In the above-described embodiment, the partition wall 80 and the side partition wall 90 are made of a metal mesh, but may be made of a porous plate such as expanded metal, a resin plate such as a transparent acrylic plate, or the like.

Second Embodiment

Figure 11:
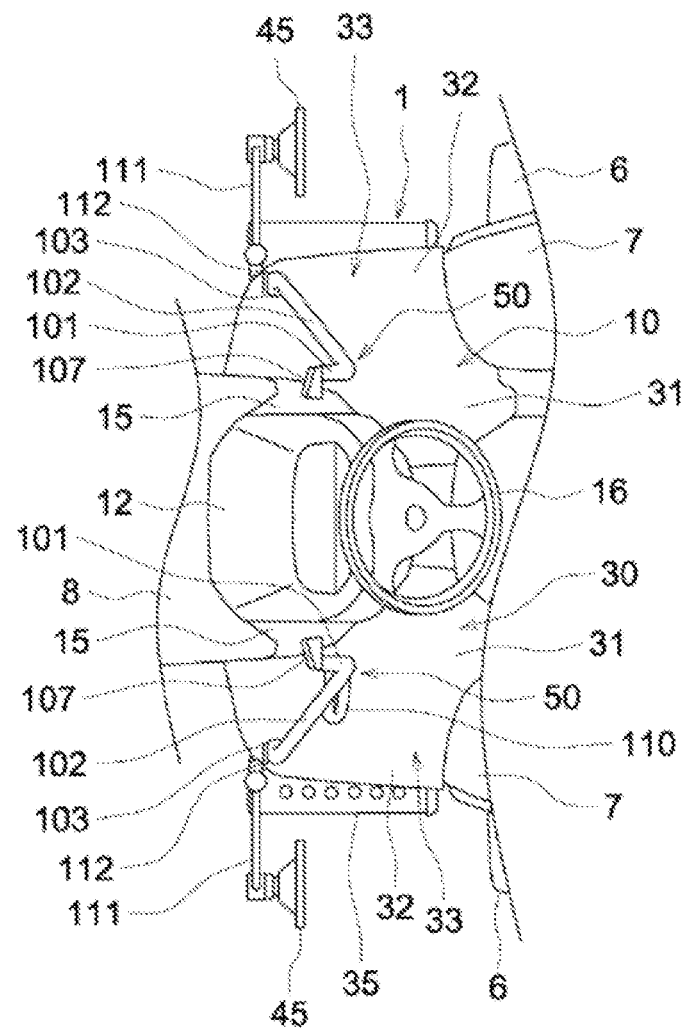
FIG. 11 is a plan view of a grip structure for boarding and deboarding a tractor according to another embodiment.
Figure 12:
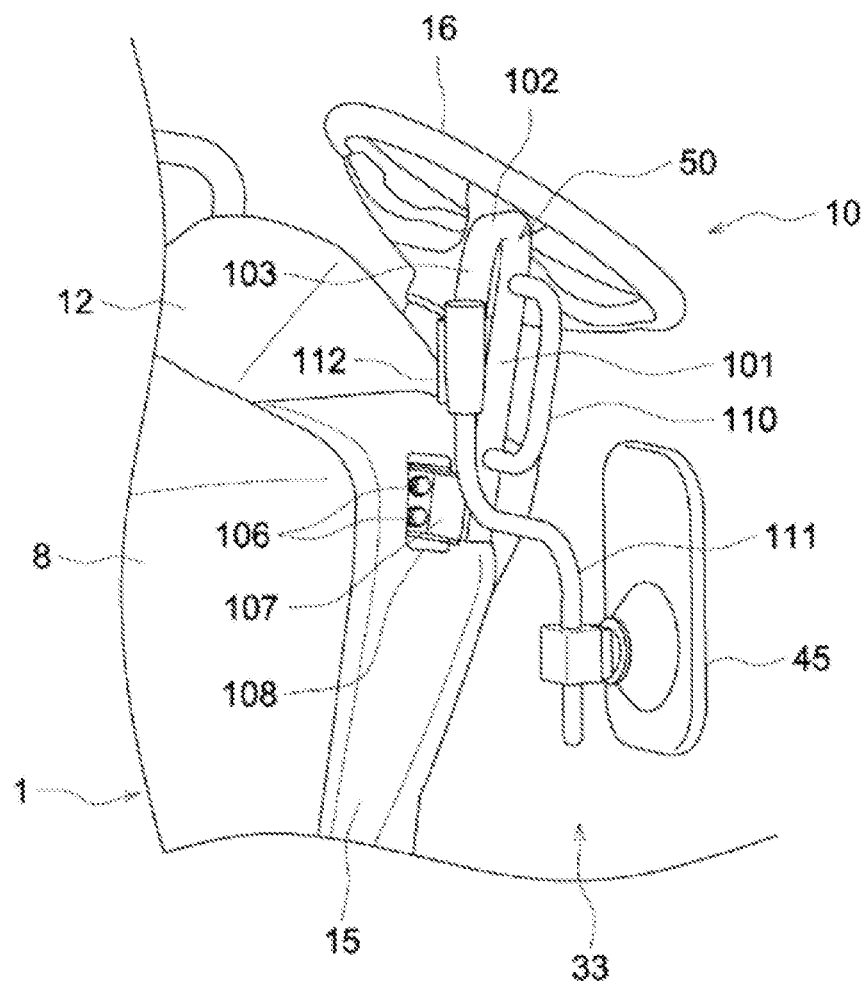
FIG. 12 is a perspective view of a grip structure for boarding and deboarding a tractor according to another embodiment.
Figure 13:
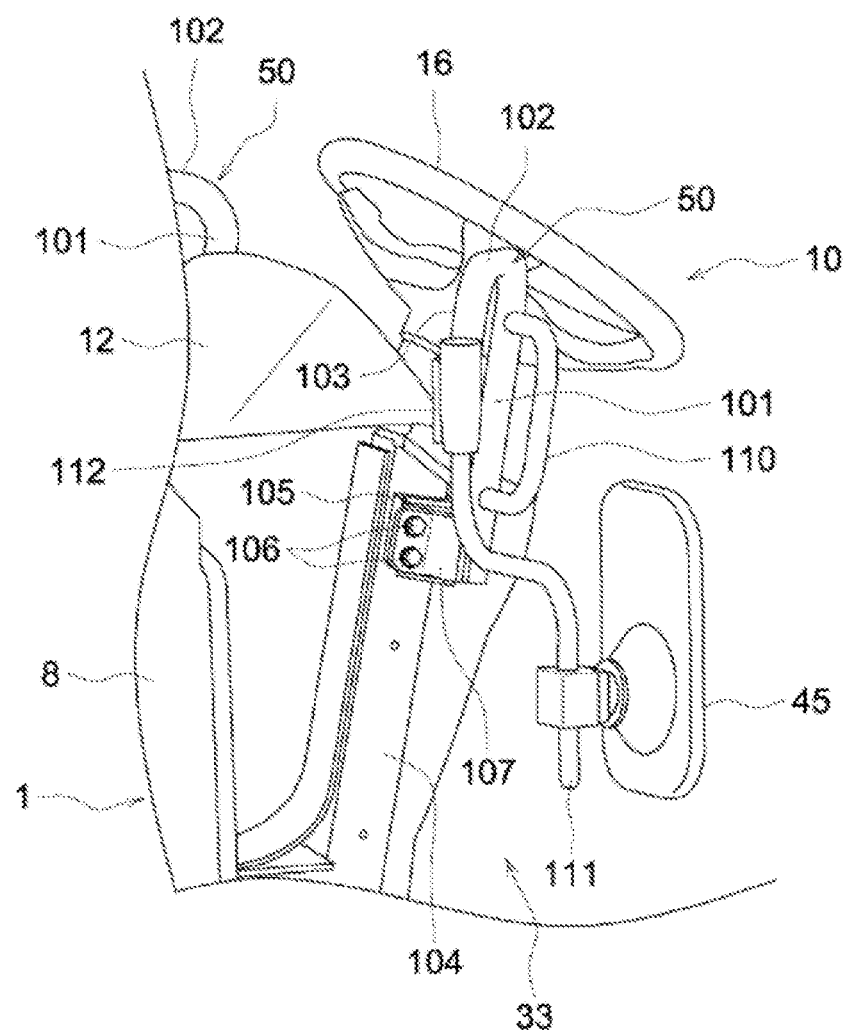
FIG. 13 is an inner perspective view of a grip structure for boarding and deboarding a tractor according to another embodiment.

In the tractor 1 which is an example of the work vehicle shown in FIGS. 11 to 13, the first gripping portions 50, which a driver can grip with her/his hand on the forward side of the vehicle body when boarding and deboarding, and the rearview mirrors 45 for confirming the rearward side are provided on both left and right sides of the steering column cover 15 disposed forward of the driver's seat 17. Although not shown, second gripping portions, which a driver can grip with her/his hand on the rearward side of the vehicle body when boarding and deboarding, are provided on the upper portions of the fenders 7 located on the rearward portion of the left and right boarding sections 33.

The tractor 1 is not provided with the left and right foot guards 40 described in the first embodiment described above.

As shown in FIGS. 11 to 13, each of the left and right first gripping portions 50 includes a base end side support body 101, a second horizontal gripping body 102, and a front end side support body 103. The base end side support body 101 extends upward along the vertical direction. The second horizontal gripping body 102 extends horizontally or substantially horizontally in an inclined posture that is positioned further forward toward the outward side from the upper end portion of the base end side support body 101 in a plan view. The front end side support body 103 extends downward in an inclined posture from the distal end of the second horizontal gripping body 102 toward the inner side in the vehicle body. The base end side support body 101, the second horizontal gripping body 102, and the front end side support body 103 of each of the first gripping portions 50 are continuously formed by bending a round pipe.

As shown in FIGS. 12 and 13, a mounting bracket 107 is fixed to a mounting seat 105 provided on a column frame 104 in the steering column cover 15 so as to be detachably connected with a bolt 106, at the lower end portion of the base end side support body 101 of each of the first gripping portions 50. Openings 108, through which the mounting bracket 107 of each of the first gripping portions 50 can be inserted from the left and right directions, are formed on both left and right sides of the steering column cover 15. Bolt insertion holes for the mounting seat 105 of the column frame 104 and the mounting bracket 107 of the first gripping portion 50 are disposed in the opening 108 so as to be exposed to the outward side. Therefore, it is possible to easily perform a bolt operation for tightening and fixing the mounting bracket 107 of the first gripping portion 50 to the mounting seat 105 of the column frame 104, and releasing the fixing, from the outside of the opening 108.

As shown in FIGS. 11 to 13, an auxiliary grip 110, which is formed to be bent in a substantially "U" shape in a front view, is provided on the base end side support body 101 of the first gripping portion 50 located on the left side of the vehicle body so as to protrude outward of the vehicle body in an orientation along the left-right direction. A mounting portion 112 for mounting a support arm 111 of the rearview mirror 45 is provided on the front end side support body 103 of each of the first gripping portions 50.

As described above, the mounting bracket 107 of the first gripping portion 50 is mounted on the mounting seat 105 provided on the column frame 104. Therefore, compared with the case where the mounting bracket of the first gripping portion 50 extends from the boarding section 33 side of the driver's step 30, it is possible to secure a large space for boarding and deboarding to and from the driver's step 30. Further, it is possible to perform the attachment and detachment operation of the mounting seat 105 of the column frame 104 and the mounting bracket 107 of the first gripping portion 50, through the opening 108 formed in the steering column cover 15 from the outside. Therefore, it is possible to easily attach and detach the first gripping portion 50 to and from the mounting seat 105 of the column frame 104, without removing the steering column cover 15. Further, the first gripping portion 50, which is sturdy and can be mounted on the column frame 104, can also be used as the mounting stay for the rearview mirror 45. Therefore, it is possible to simplify the mounting structure of the first gripping portion 50 and the rearview mirror 45.

Note that the same components as those described in the first embodiment will be denoted by the same reference numerals as in the first embodiment, and the description thereof will be omitted.

Figure 14:
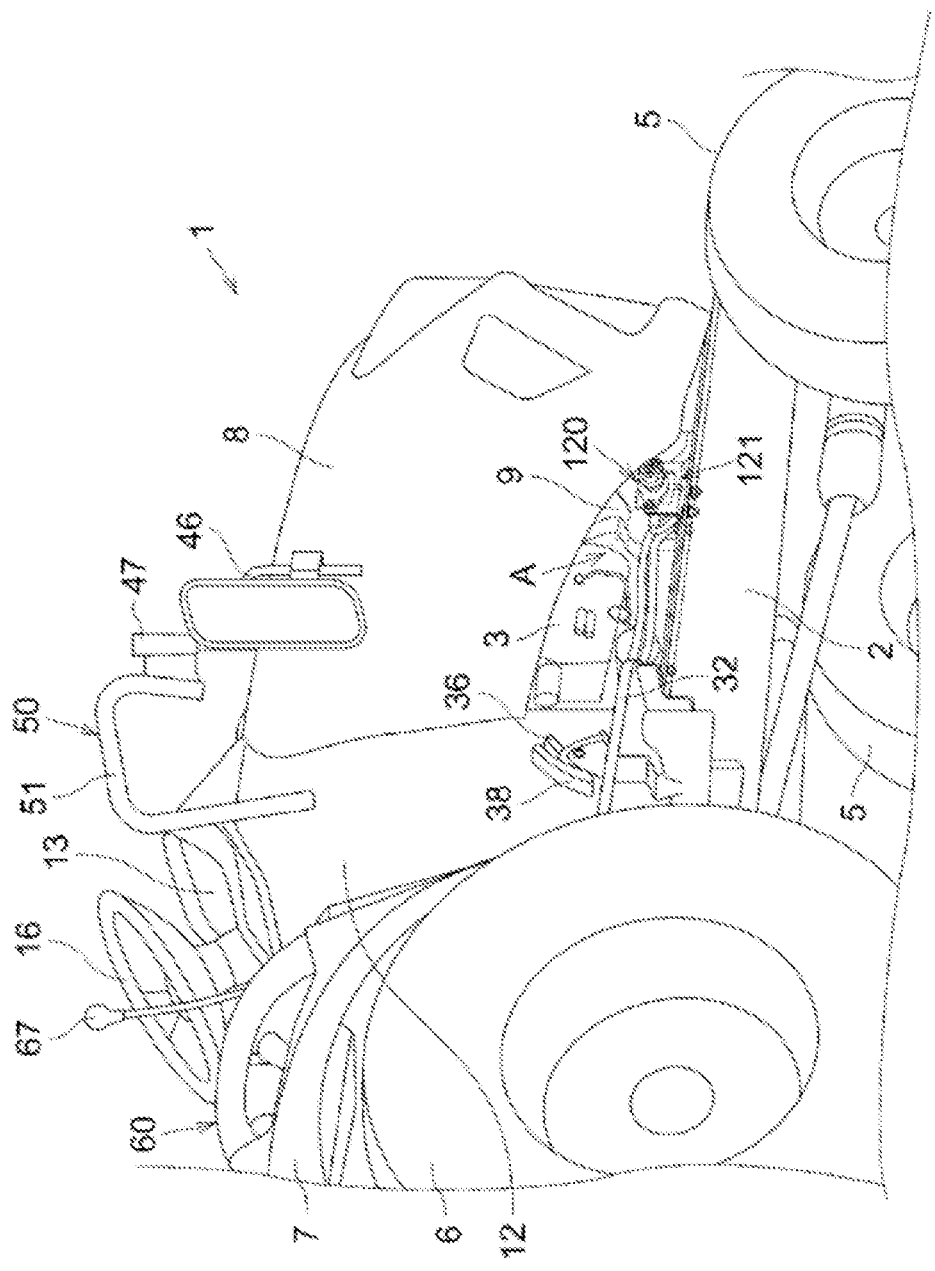
FIG. 14 is a perspective view of a gap portion between a hood and a body frame of a tractor from a rear view.
Figure 15:
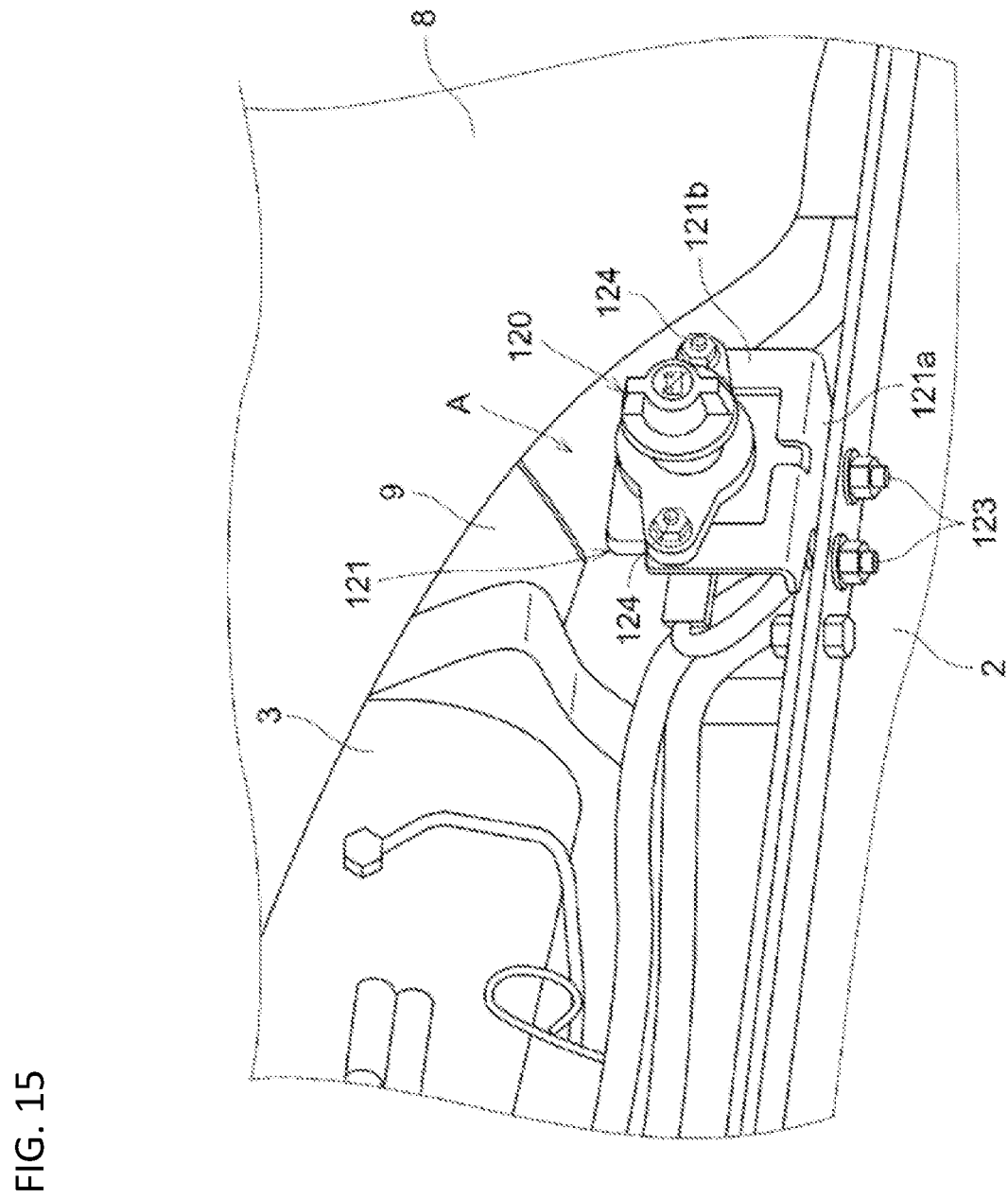
FIG. 15 is an enlarged perspective view of a portion for installing a battery cut switch in FIG. 14.

As shown in FIGS. 14 and 15, the tractor 1 is provided with a battery cut switch 120 capable of manually cutting off the power supply from the battery. This aims to prevent spontaneous discharge of a battery (not shown) installed inside the hood 8, and shutting off the power during maintenance, and the like.

The battery cut switch 120 is positioned with an orientation so as to appropriately guard the gap portion A between the machine body frame 2 and the hood 8 above the machine body frame 2 on the right and forward side of the vehicle body. In such an orientation, the battery cut switch 120 is fixed to the upper surface of the machine body frame 2 below the gap portion A via a mounting bracket 121. The mounting bracket 121 includes a base plate portion 121a along the upper surface of the machine body frame 2, and a mounting plate portion 121b that bends upward from an outward edge portion of the base plate portion 121a and extends upward. Further, the base plate portion 121a is fixed to the upper surface of the machine body frame 2 with a bolt 123, and the battery cut switch 120 is fixed to the mounting plate portion 121b with a bolt 124.

With such a configuration, it is possible to appropriately prevent an operator's hand or the like from intruding into the inside of the hood 8 through the gap portion A, and touching a radiator fan 9 or the like inside the hood 8. This effect is obtained by the battery cut switch 120 and the mounting bracket 121 provided in the orientation that covers the gap portion A.

Further, the mounting structure of the battery cut switch 120 has a configuration in which the battery cut switch 120 can be mounted on the machine body frame 2 without being affected by the open/closed state of the hood 8 and the specification or the like. As a result, it is possible to easily perform maintenance work to replace parts, and share parts by a plurality of kinds of tractors.

Figure 16:
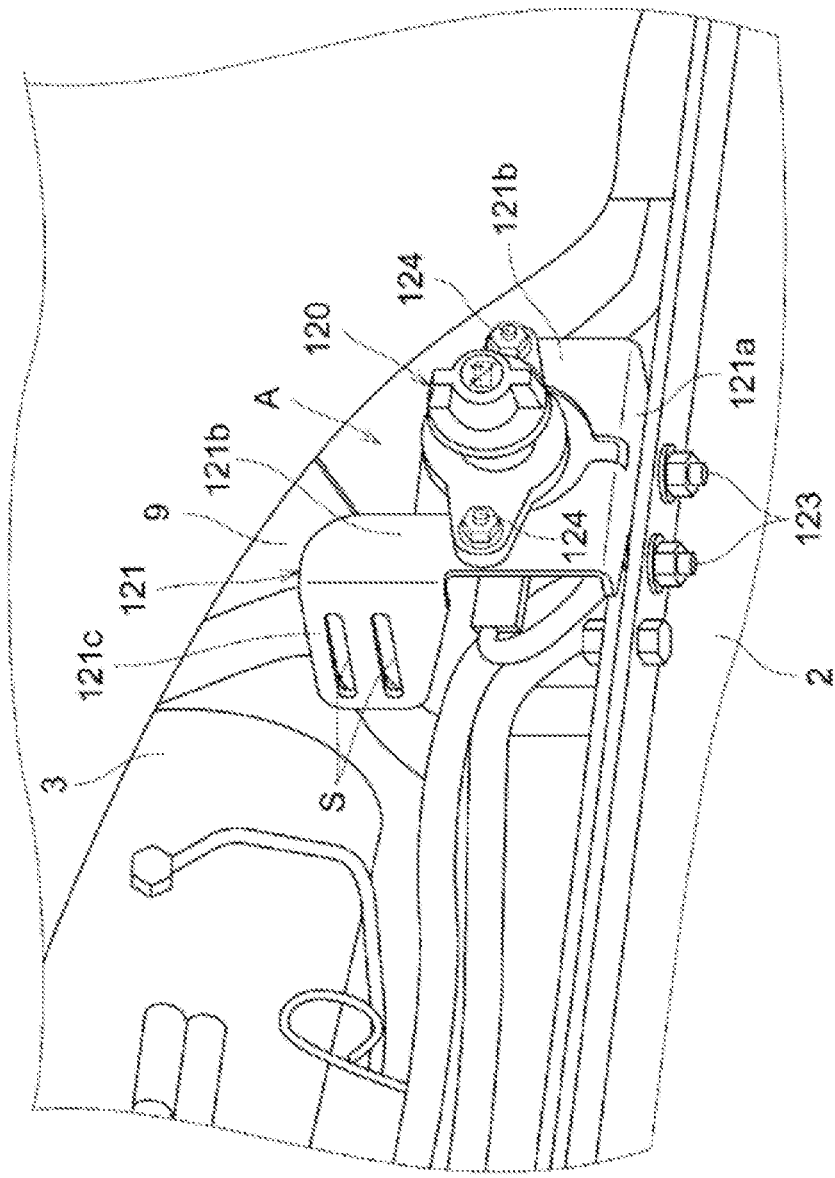
FIG. 16 is a perspective view of a bracket for installing the battery cut switch.

Further, as shown in FIG. 16, a guard plate portion 121c may be provided on the mounting bracket 121 so as to be bent inward from the rearward edge portion of the mounting plate portion 121b and extend toward the inside of the hood 8. By providing the guard plate portion 121c on the mounting bracket 121 as described above, it is possible to appropriately guard the gap portion A with a wide range, and to further prevent an operator's hand from intruding into the inside of the hood 8 through the gap portion A. Further, the guard plate portion 121c is formed with a slit port S through which air can pass. Thereby, the airflow passing through the gap portion A generated by the radiator fan 9 is maintained in a good state.

According to the present embodiment, the gap portion A between the hood 8 and the machine body frame 2 is appropriately guarded by the battery cut switch 120 or the mounting bracket 121 to prevent intrusion by an operator's hand or the like. However, it is also possible to adopt a configuration in which the battery cut switch 120 is installed at another location, and the gap portion A is guarded by another member.

OTHER EMBODIMENTS (1) According to each of the above-described embodiments, the boarding sections 33 that enable to board and deboard to and from the respective driver's steps 30 at the forward side positions of the left and right fenders 7, respectively. However, the boarding section 33 may be provided only at the forward side position of one of the fenders 7.

(2) According to the first embodiment described above, the lower end portion of the vertical gripping body 52 and the lower end portion of the vertical mounting body 53 which are continuous at both of the ends of the horizontal gripping body 51 of the first gripping portion 50 are fixed to the foot guard 40. However, only the lower end portion of the vertical gripping body 52 or the lower end portion of the vertical mounting body 53 may be fixed to the foot guard 40.

INDUSTRIAL APPLICABILITY

The present invention can be suitably used in various kinds of work vehicles capable of boarding and deboarding to and from a lateral side of the vehicle body.

DESCRIPTION OF REFERENCE NUMERALS

6 REAR TRAVELING UNITS (REAR WHEELS)
7 FENDER
15 STEERING COLUMN COVER

16 STEERING WHEEL
17 DRIVER'S SEAT
30 DRIVER'S STEP
33 BOARDING SECTION
40 FOOT GUARD
45 REARVIEW MIRROR
50 GRIPPING PORTION (FIRST GRIPPING PORTION)
51 HORIZONTAL GRIPPING BODY
52 VERTICAL GRIPPING BODY
102 SECOND HORIZONTAL GRIPPING BODY
104 COLUMN FRAME
105 MOUNTING SEAT
107 MOUNTING BRACKET
108 OPENING
112 MOUNTING PORTION

The invention claimed is:

1. A work vehicle comprising:
a driver's step;
a driver's seat disposed further rearward than the driver's step and between rear traveling units on left and right sides;
a steering wheel disposed in front of the driver's seat;
fenders on the left and right sides that cover upper portions of both the rear traveling units;
a boarding section that enables boarding to and deboarding from the driver's step at a position on a front side of at least one of the fenders; and
a gripping portion that is provided on a forward portion of the boarding section and is graspable to a driver when boarding and deboarding,
wherein the gripping portion extends upward from a foot guard covering the front side of the boarding section, and a lower portion of the gripping portion is provided on a forward portion of a side portion of the foot guard on an outward side of the vehicle body.

2. The work vehicle according to claim 1, the gripping portion is configured in an inclined posture that is positioned further forward toward the outward side of the vehicle body, in a plan view.

3. The work vehicle according to claim 2,
wherein the gripping portion includes:
a horizontal gripping body horizontally or substantially horizontally disposed in an inclined posture that is positioned further forward toward the outward side of the vehicle body in a plan view; and
a vertical gripping body which continues to an end portion of the horizontal gripping body on the outward side of the vehicle body, and
wherein the vertical gripping body is connected to the foot guard in a position, where the vertical gripping body extends along a vertical direction.

4. The work vehicle according to claim 3,
wherein a lower end portion of the vertical gripping body of the gripping portion is provided on the forward portion of the side edge portion of the foot guard on the outward side of the vehicle body.

* * * * *